Patented Jan. 25, 1944

2,339,789

UNITED STATES PATENT OFFICE 2,339,789

PROCESS FOR PRODUCING BETA-(1-NAPHTHOYL) PROPIONIC ACID

John F. Lontz, Westwood Manor, Del., assignor to E. I. du Pont de Nemours & Company, Wilmington, Del., a corporation of Delaware No Drawing. Application December 10, 1941, Serial No. 422,405

4 Claims. (Cl. 260—515)

This invention relates to processes for producing beta-(1-naphthoyl) propionic acid and is more particularly directed to processes in which naphthalene and succinic anhydride are dissolved in monochlorobenzene, a condensation reaction between the naphthalene and succinic anhydride is effected by adding about two moles of anhydrous aluminum chloride per mole of succinic anhydride, and the reaction product thus formed is hydrolyzed to beta-(1-naphthoyl) propionic acid.

Numerous methods have been used for producing beta-(1-naphthoyl) propionic acid, but such methods hitherto available have all suffered from the disadvantage that there is produced, along with the beta-1 product, a considerable proportion of the beta-(2-naphthoyl) propionic acid modification. It has, for instance, already been considered feasible to produce a product containing only 10 per cent of the beta-1 isomer and purify this product by complicated recrystallization procedures until the beta-1 isomer content had been built up to the desired strength. Obviously, such elaborate recrystallization procedures add considerably to the cost of the final product and entail product losses which result in a poor overall yield being obtained.

It is an object of this invention to provide processes for producing beta-(1-naphthoyl) propionic acid in improved yields. Another object is to produce beta-(1-naphthoyl) propionic acid in which there is present no more than a minor proportion of beta-(2-naphthoyl) propionic acid. It is another object to produce beta-(1-naphthoyl) propionic acid in good yields by reaction of naphthalene and succinic anhydride using an aluminum chloride catalyst. Another object is to produce beta-(1-naphthoyl) propionic acid by processes involving fewer manipulative steps than methods heretofore available. Further objects will appear hereinafter.

The foregoing and other objects of this invention are accomplished by processes comprising dissolving naphthalene and succinic anhydride in monochlorobenzene, effecting a condensation reaction between the naphthalene and succinic anhydride by adding about two moles of anhydrous aluminum chloride, preferably iron-free, per mole of succinic anhydride, and hydrolyzing the reaction product thus formed. The products formed according to these processes are obtained in yields of 60 per cent or more of theoretical, based on a product containing only beta-1 and beta-2 isomers, the beta-2 isomer being present in an amount not over 10 per cent of the total. The crude reaction products may readily be purified by solution in aqueous sodium hydroxide and reacidification and recrystallization.

The practice of this invention will be better understood by reference to the following illustrative example which is not to be construed as limiting.

*Example*

A mixture of 3598 parts by weight of monochlorobenzene and 827 parts (6.2 mols) of anhydrous aluminum chloride substantially free from iron was placed in a vessel fitted with a mechanical stirrer and reflux condenser and surrounded by means for maintaining the temperature at 0 to 5° C. throughout the entire addition and reaction period herein described. To the rapidly stirred slurry there was added a finely pulverized mixture of 603 parts (4.71 mols) of naphthalene and 302 parts (3.02 mols) of succinic anhydride over a period of one and one-half hours. The stirring was continued for a three-quarter hour period after the conclusion of the addition of the reacting components. At the end of this time there was obtained a black viscous liquid comprising an intermediate reaction product. This intermediate product was hydrolyzed by pouring it into a mixture of 3000 parts by weight of ice and 499.8 parts by weight of a concentrated hydrochloric acid solution containing 37.5 per cent HCl. There was obtained a reaction product comprising beta-(1-naphthoyl) propionic acid which separated out as a precipitate ranging in color from white to yellow. These crystals were filtered off from the menstruum of aqueous hydrochloric acid and monochlorobenzene.

The product obtained as above contained beta-(1-naphthoyl) propionic acid in an amount equivalent to a yield of 85 per cent of theoretical based on the succinic anhydride used. While this product was suitable in its crude condition for many purposes, it was associated with minor amounts of contaminants such as excess naphthalene. A product of high purity was obtained from this crude product in the following manner:

The crude product was dissolved in a solution containing 366 parts by weight of sodium hydroxide in 10,000 parts of water. One hundred twenty parts of activated carbon was added to this solution and the mixture was maintained at the boiling point for a period of one hour. The mixture was then filtered and the beta-(1-naphthoyl) propionic acid was regenerated from the filtrate by slowly adding a 7.2 per cent aqueous solution of hydrochloric acid with rapid stirring until the pH of the solution was 1.5. The micro crystals of beta-(1-naphthoyl)propionic acid thus precipitated were removed by filtration, washed free of chlorides with water and dried. There was obtained a pure beta-naphthoyl propionic acid product consisting of 92 per cent beta-1 isomer and 8 per cent beta-2 isomer and having a melting point of from 122 to 123° C. The yield of this product based on the original succinic anhydride used was 70 per cent of the theoretical.

While in the foregoing example the use of particular conditions and particular reactants is shown, it will be understood that the practice of this invention is not limited thereby and that there may be a considerable variation and modification of conditions and substitution of equivalents.

The reactants used according to the processes of this invention, namely, succinic anhydride and naphthalene, as well as the solvent, monochlorobenzene, and the aluminum chloride, should all be substantially anhydrous. Technical grades of these materials which are commercially available are sufficiently anhydrous to give good results and care need to be exercised only to prevent inclusion of water from extraneous sources. It is therefore preferable to carry out the reaction in a covered vessel.

During the course of the reaction the temperature should be maintained in the range from about −8 to +20° C. and preferably should be held in the range from 0 to 5° C. Higher temperatures than 20° result in a reduction of yield of beta-1 isomer.

The time required for the reaction will be governed by a variety of conditions such as degree of agitation, degree of subdivision of reactants, and the temperature of the reaction. In general, the time should be held to the minimum required for complete reaction. The time of two and one-quarter hours as shown in the foregoing example gave good results under the conditions therein employed.

The aluminum chloride used in the reaction may be added to the monochlorobenzene before or after the dissolution of the succinic anhydride and naphthalene. While ordinary grades of aluminum chloride may be employed in conjunction with monochlorobenzene as a solvent according to this invention, it is preferred that the aluminum chloride should be substantially iron-free, improved yields thereby being obtainable. It is also preferred to use about 2 moles of aluminum chloride per mole of succinic anhydride.

The hydrolysis of the intermediate reaction product of succinic anhydride, naphthalene, and aluminum chloride may be accomplished according to methods with which the art is already familiar for hydrolysis reactions. The use of a strong acid in aqueous solution, such as the hydrochloric acid of the foregoing example, is particularly well adapted for this step, and there may be substituted for the hydrochloric acid other acids which are non-reactive with the product, such as sulfuric, acetic, or formic acids.

The crude product obtained by the hydrolysis according to a process of this invention may be used without further purification or it may be recrystallized or otherwise purified by such methods as recrystallization from glacial acetic acid, from methyl or ethyl alcohol, or the crude product may be continuously extracted with water and the purified material crystallized out of the extraction solution. For products of exceptional purity, however, it is preferred to redissolve the product in sodium hydroxide solution and reneutralize with acid as shown in the foregoing example.

While in the foregoing description of this invention there have been shown particular conditions and reactants, it will be understood that without departing from the scope of the invention one skilled in the art may employ numerous processes to produce beta-(1-naphthoyl)propionic acid.

I claim:

1. In a process for the production of beta-(1-naphthoyl)propionic acid, the steps comprising dissolving naphthalene and succinic anhydride in monochlorobenzene, effecting a condensation reaction between the naphthalene and succinic anhydride by adding about two moles of anhydrous aluminum chloride per mole of succinic anhydride, and hydrolyzing the product of the condensation reaction.

2. In a process for the production of beta-(1-naphthoyl)propionic acid, the steps comprising dissolving naphthalene and succinic anhydride in monochlorobenzene, effecting a condensation reaction between the naphthalene and succinic anhydride by adding about two moles of anhydrous substantially iron-free, aluminum chloride per mole of succinic anhydride, and hydrolyzing the product of the condensation reaction.

3. In a process for the production of beta-(1-naphthoyl)propionic acid, the steps comprising dissolving naphthalene and succinic anhydride in monochlorobenzene, effecting a condensation reaction between the naphthalene and succinic anhydride by adding about two moles of anhydrous substantially iron-free, aluminum chloride per mole of succinic anhydride, hydrolyzing the product of the condensation reaction, dissolving the crude reaction product thus obtained in aqueous sodium hydroxide solution, treating the aqueous solution with activated carbon, filtering the treated solution, and acidifying the filtered solution, whereby a beta-(1-naphthoyl)propionic acid containing not more than about 10 per cent by weight of beta-(2-naphthoyl)propionic acid is precipitated, and separating and drying such precipitate.

4. In a process for the production of beta-(1-naphthoyl) propionic acid, the steps comprising dissolving naphthalene and succinic anhydride in monochlorobenzene, effecting a condensation reaction between the naphthalene and succinic anhydride at about 0 to 5° C. by adding about two moles of anhydrous, substantially iron-free, aluminum chloride per mole of succinic anhydride, and hydrolyzing the product of the condensation reaction.

JOHN F. LONTZ.